(12) United States Patent
Jeong et al.

(10) Patent No.: US 11,943,832 B2
(45) Date of Patent: Mar. 26, 2024

(54) UE ASSISTANCE INFORMATION REPORT FOR SIDELINK DRX

(71) Applicant: Samsung Electronics Co., Ltd., Suwon-si (KR)

(72) Inventors: Kyeongin Jeong, Allen, TX (US); Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 17/350,927

(22) Filed: Jun. 17, 2021

(65) Prior Publication Data

US 2021/0400762 A1 Dec. 23, 2021

Related U.S. Application Data

(60) Provisional application No. 63/087,639, filed on Oct. 5, 2020, provisional application No. 63/042,198, filed on Jun. 22, 2020.

(51) Int. Cl.
*H04W 24/10* (2009.01)
*H04W 76/28* (2018.01)
*H04W 4/40* (2018.01)

(52) U.S. Cl.
CPC ........... *H04W 76/28* (2018.02); *H04W 24/10* (2013.01); *H04W 4/40* (2018.02)

(58) Field of Classification Search
CPC ....... H04W 76/28; H04W 24/10; H04W 4/40; H04W 24/02; H04W 76/14; H04W 72/25; H04W 92/10; H04W 92/18
See application file for complete search history.

(56) References Cited

U.S. PATENT DOCUMENTS

| 2019/0174411 A1 | 6/2019 | Xu et al. |
| 2023/0014303 A1* | 1/2023 | Di Girolamo ........ H04W 72/20 |

FOREIGN PATENT DOCUMENTS

| EP | 3499975 A1 | 6/2019 |
| EP | 3500028 A1 | 6/2019 |
| WO | 2018016882 A1 | 1/2018 |
| WO | 2018064477 A1 | 4/2018 |

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.

(Continued)

*Primary Examiner* — Chuong A Ngo

(57) ABSTRACT

Methods and apparatuses in a wireless communication system. A method of operating a user equipment BS includes generating a first indicator requesting a report of a set of sidelink (SL) discontinuous reception (DRX) configurations for SL communications among user equipments (UEs); transmitting a downlink signal including the first indicator; receiving an uplink signal including the report of the set of the SL DRX configurations based on the first indicator indicating that the report of the set of the SL DRX configurations is requested; and configuring, based on the report of the set of the SL DRX configurations, a network DRX configuration for a Uu interface between a UE and a network entity including the BS.

20 Claims, 10 Drawing Sheets

(56) References Cited

OTHER PUBLICATIONS

"3rd Generation Partnership Project; Technical Specification Group Radio Access Network; NR; Physical layer procedures for control (Release 16)" 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"3rd Generation Partnership Project; Technical Specification Group Radio Access Network; NR; Medium Access Control (MAC) protocol specification (Release 16)", 3GPP TS 38.321 V16.0.0, Mar. 2020, 141 pages.
"3rd Generation Partnership Project; Technical Specification Group Radio Access Network; NR; Radio Resource Control (RRC) protocol specification (Release 16)", 3GPP TS 38.331 V16.0.0, Mar. 2020, 835 pages.
"3rd Generation Partnership Project; Technical Specification Group Radio Access Network; NR; Study on NR Vehicle-to-Everything (V2X) (Release 16)", 3GPP TR 38.885 V16.0.0, Mar. 2019, 122 pages.
"3rd Generation Partnership Project; Technical Specification Group Radio Access Network; NR; Radio Link Control (RLC) protocol specification (Release 16)", 3GPP TS 38.322 V16.0.0, Mar. 2020, 33 pages.
"3rd Generation Partnership Project; Technical Specification Group Radio Access Network; NR; Packet Data Convergence Protocol (PDCP) specification (Release 16)", 3GPP TS 38.323 V16.0.0, Mar. 2020, 37 pages.
"3rd Generation Partnership Project; Technical Specification Group Radio Access Network; E-UTRA and NR; Service Data Adaptation Protocol (SDAP) specification (Release 16)", 3GPP TS 37.324 V16.0.0, Mar. 2020, 16 pages.
International Search Report of the International Searching Authority in connection with International Application No. PCT/KR2021/007838 dated Sep. 27, 2021, 3 pages.
3GPP TR 23.776 V0.1.0 (Jun. 2020) Technical Report; 3rd Generation Partnership Project; Technical Specification Group Services and System Aspects; Study on architecture enhancements for 3GPP support of advanced Vehicle-to-Everything (V2X) services; Phase 2 (Release 17), 11 pages.
Extended European Search Report dated Nov. 6, 2023 regarding Application No. 21828877.7, 10 pages.
ZTE, "Discussion on PC5 connection establishment and maintenance", 3GPP TSG-RAN WG2 Meeting #97, R2-1700794, Feb. 2017, 4 pages.

* cited by examiner

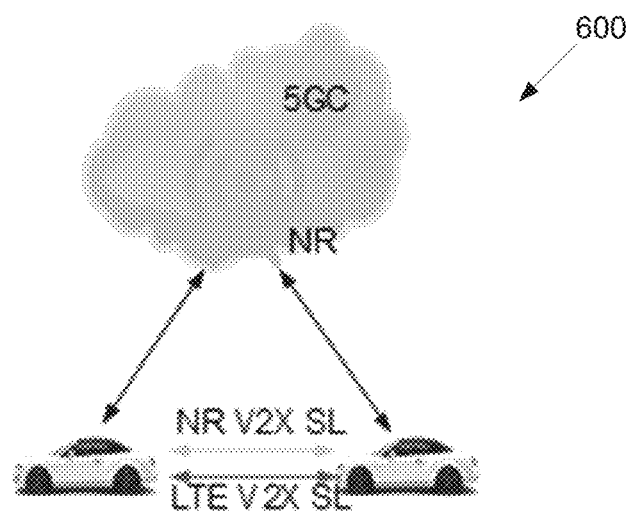
FIG. 6
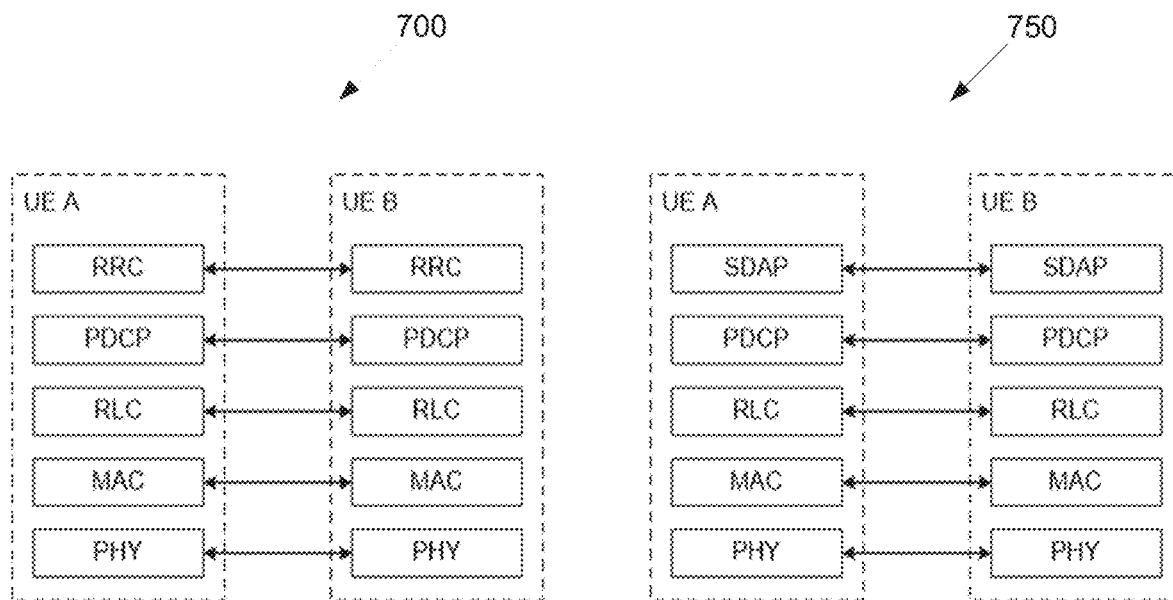
FIG. 7A
FIG. 7B

UE ASSISTANCE INFORMATION REPORT FOR SIDELINK DRX

CROSS-REFERENCE TO RELATED APPLICATIONS AND CLAIM OF PRIORITY

The present application claims priority to U.S. Provisional Patent Application No. 63/042,198, filed on Jun. 22, 2020 and U.S. Provisional Patent Application No. 63/087,639, filed on Oct. 5, 2020. The content of the above-identified patent document is incorporated herein by reference.

TECHNICAL FIELD

The present disclosure relates generally to wireless communication systems and, more specifically, the present disclosure relates to user equipment (UE) assistance information report for sidelink discontinuous reception (DRX).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates UE assistance information report for sidelink DRX.

In one embodiment, a base station (BS) in a wireless communication system is provided. The BS includes a processor configured to generate a first indicator requesting a report of a set of sidelink (SL) DRX configurations for SL communications among UEs. The BS further includes a transceiver operably connected to the processor, the transceiver configured to: transmit a downlink signal including the first indicator and receive an uplink signal including the report of the set of the SL DRX configurations based on the first indicator indicating that the report of the set of the SL DRX configurations is requested. The processor of the BS is further configured to configure, based on the report of the set of the SL DRX configurations, a network DRX configuration for a Uu interface between a UE and a network entity including the BS.

In another embodiment, a method of BS in a wireless communication system is provided. The method comprises generating a first indicator requesting a report of a set of SL DRX configurations for SL communications among UEs; transmitting a downlink signal including the first indicator; receiving an uplink signal including the report of the set of the SL DRX configurations based on the first indicator indicating that the report of the set of the SL DRX configurations is requested; and configuring, based on the report of the set of the SL DRX configurations, a network DRX configuration for a Uu interface between a UE and a network entity including the BS.

In yet another embodiment, a method of a UE in a wireless communication system is provided. The UE includes a processor and a transceiver operably connected to the processor, the transceiver configured to receive a downlink signal including a first indicator requesting a report of a set of SL DRX configuration for SL communications with other UEs and transmit an uplink signal including the report of the set of the SL DRX configurations based on the first indicator indicating that the report of the set of the SL DRX configurations is requested. A network DRX configuration is configured, based on the report of the set of the SL DRX configurations, for a Uu interface between the UE and a network entity including a BS communicating with the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example V2X communication over sidelink according to embodiments of the present disclosure;

FIG. 7A illustrates an SL control plane radio protocol stack according to embodiments of the present disclosure;

FIG. 7B illustrates an SL user plane data radio protocol stack according to embodiments of the present disclosure;

DETAILED DESCRIPTION

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v.16.1.0, "Physical channels and modulation"; 3GPP TS 38.213 v16.1.0, "NR; Physical Layer Procedures for Control"; 3GPP TS 38.214: v.16.1.0, "Physical layer procedures for data"; 3GPP TS 38.321 v16.0.0, "Medium Access Control (MAC) protocol specification"; 3GPP TS 38.322 v.16.0.0, "Radio Link Control (RLC) protocol specification"; 3GPP TS 38.323 v.16.0.0, "Packet Data Convergence Protocol (PDCP) specification"; 3GPP TS 38.331v.16.0.0, "Radio Resource Control (RRC) protocol specification"; 3GPP TS 37.324 v.16.0.0, "Service Data Adaptation Protocol (SDAP) specification"; and 3GPP TR 38.885 v.16.0.0: "Study on NR Vehicle-to-Everything (V2X)."

Figure 1:
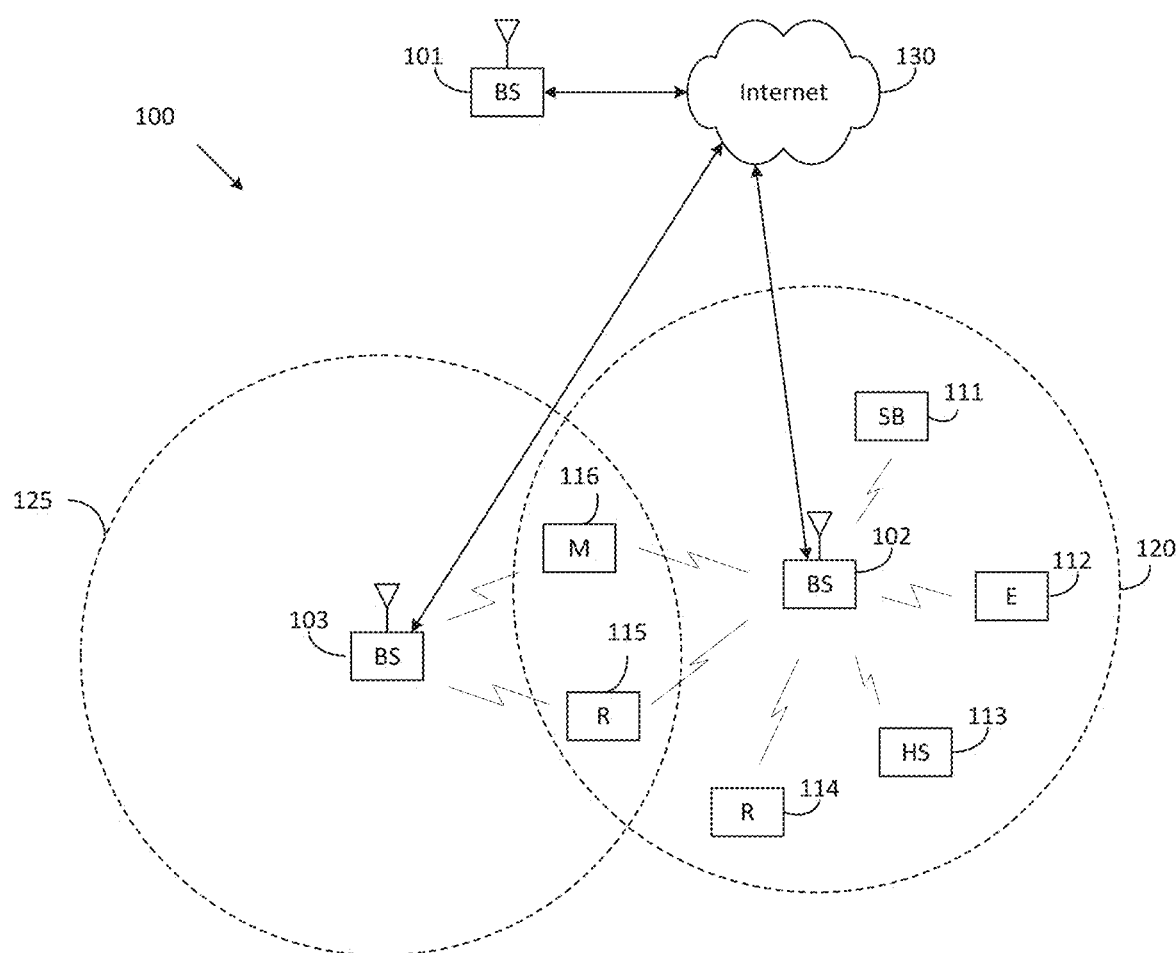
FIG. 1 illustrates an example wireless network according to embodiments of the present disclosure.
Figure 2:
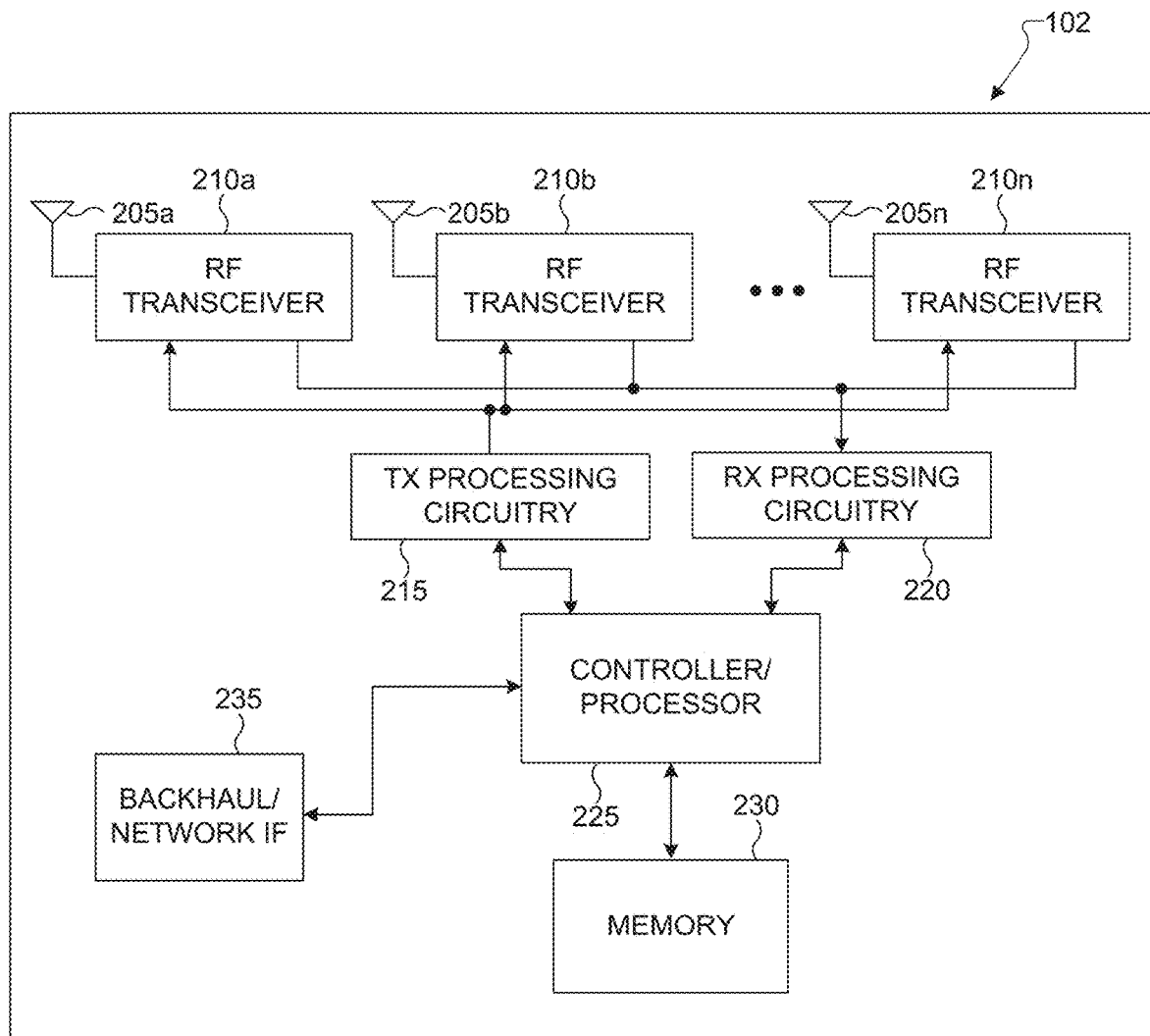
FIG. 2 illustrates an example gNB according to embodiments of the present disclosure.
Figure 3:
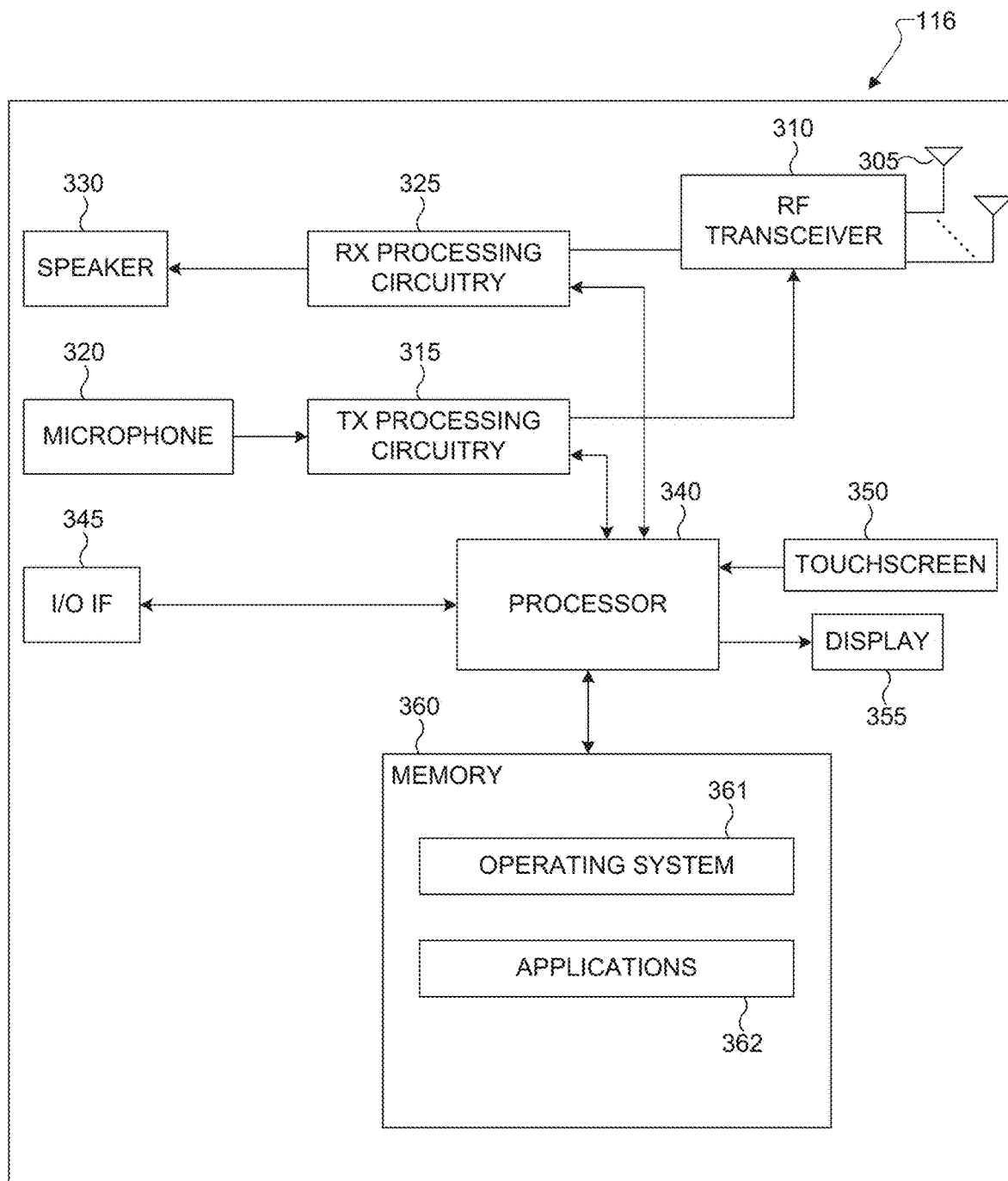
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for UE assistance information report for sidelink communication. In certain embodiments, and one or more of the gNBs 101-103 includes circuitry, programing, or a combination thereof, for UE assistance information report for sidelink communication.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support the UE assistance information report for sidelink DRX. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for UE assistance information report for sidelink DRX. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
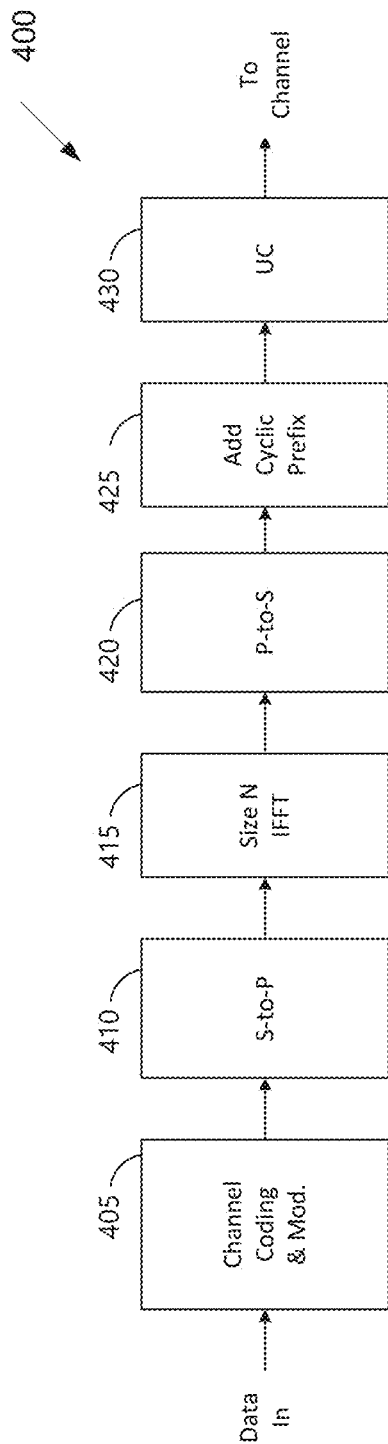
FIGS. 4 and 5 illustrate example wireless transmit and receive paths according to this disclosure.
Figure 5:
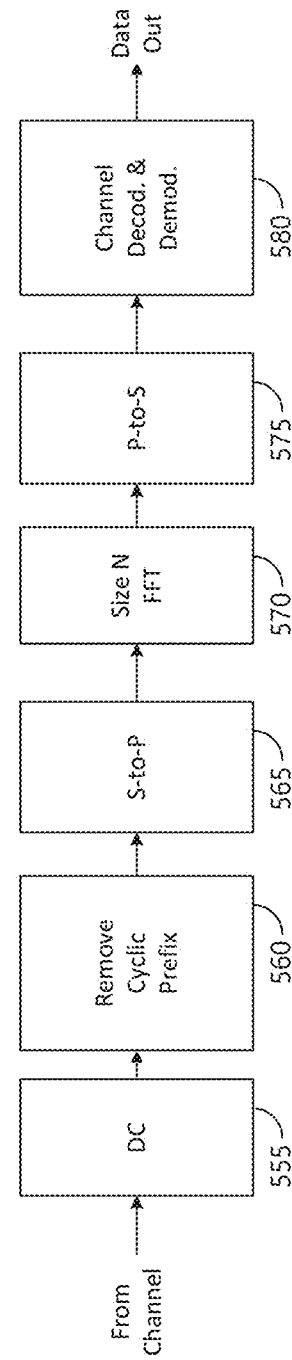

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support sidelink measurements in V2X communication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In 3GPP wireless standards, NR has been being discussed as a 5G wireless communication. One of NR features under the discussion is V2X.

FIG. 6 illustrate an example V2X communication over sidelink 600 according to embodiments of the present disclosure. An embodiment of the V2X communication over sidelink 600 shown in FIG. 6 is for illustration only.

FIG. 6 illustrates an example scenario of vehicle to vehicle communication. Two or multiple vehicles can transmit and receive data/control over direct link/interface between vehicles. The direct link/interface between vehicles or between vehicle and other things is named as a sidelink (SL) in 3GPP. Note that the FIG. 6 describes the scenario where the vehicles still can communicate with a gNB in order to acquire SL resources, SL radio bearer configurations, etc., however it is also possible even without interaction with the gNB, vehicles still communicate each other over the SL. In the case, the SL resources, the SL radio bearer configurations, etc., are preconfigured (e.g., via V2X server or any other core network entity).

In 3rd generation partnership project (3GPP) wireless standards, new radio access technology (NR) is discussed as 5G wireless communication. One of NR features under the discussion is vehicle-to-everything (V2X).

FIG. 6 illustrates an example V2X communication over sidelink 600 according to embodiments of the present disclosure. An embodiment of the V2X communication over sidelink 600 shown in FIG. 6 is for illustration only.

FIG. 6 illustrates the example scenario of vehicle to vehicle communication. Two or multiple vehicles can transmit and receive data/control over direct link/interface between vehicles. The direct link/interface between vehicles or between vehicle and other thing (e.g., pedestrian device or any device related to transportation system) or between other things is named as SL (Sidelink) in 3GPP.

In various embodiments, the vehicles communicate each other and the vehicles are located in in-coverage of NR network. Vehicles communicate with the gNB in order to acquire SL related resource information (e.g., SL resource pool configuration, etc.), SL radio bearer configurations (SL medium access control (MAC), radio link control (RLC), packet data convergence protocol (PDCP), service data adaptation protocol (SDAP), radio resource control (RRC) related configurations), etc.

The vehicles transmit/receive the data/control each other over SL once the vehicles acquire SL related configurations from the gNB. It notes that it is also possible even without interaction with the gNB (e.g., vehicles are located in out-of-coverage of NR network), vehicles still communicate each other over SL. In the case, SL resources, SL radio bearer configuration, etc. are preconfigured (e.g., via V2X server or any other core network entity). For more detailed V2X scenarios and studies are captured in 3GPP standard specification.

For SL communication, the radio interface layer1/layer 2/layer 3 (L1/L2/L3) protocols comprise, as specified in 3GPP standard specification, physical (PHY) protocol, MAC, RLC, PDCP, RRC, and SDAP.

FIG. 7A illustrates an SL control plane radio protocol stack 700 according to embodiments of the present disclosure. An embodiment of the SL control plane radio protocol stack 700 shown in FIG. 7A is for illustration only.

FIG. 7B illustrates an SL user plane data radio protocol stack 750 according to embodiments of the present disclosure. An embodiment of the SL user plane data radio protocol stack 750 shown in FIG. 7B is for illustration only.

A physical protocol layer handles physical layer signals/channels and physical layer procedures (e.g., physical layer channel structures, physical layer signal encoding/decoding, SL power control procedure, SL channel status information (CSI) related procedure). Main physical SL channels and signals are defined as follow: (1) a physical sidelink control channel (PSCCH) indicates resource and other transmission parameters used by a UE for PSSCH; (2) a physical sidelink shared channel (PSSCH) transmits the transport blocks (TBs) of data themselves and CSI feedback information, etc.; (3) a physical sidelink feedback channel (PSFCH) transmits HARQ feedback over the sidelink from a UE which is an intended recipient of a PSSCH transmission to the UE which performed the transmission; (4) a sidelink synchronization signal includes sidelink primary and sidelink secondary synchronization signals (S-PSS, S-SSS); and (5) a physical sidelink broadcast channel (PSBCH) indicates the required essential system information for SL operations.

A MAC protocol layer performs packet filtering (e.g., determine whether the received packet is actually destined to the UE (based on the L2 source and destination ids in the MAC header), SL carrier/resource pool/resource within the resource pool (re)selection, priority handling between SL and UL (Uplink) for a given UE, SL logical channel prioritization, the corresponding packet multiplexing (e.g., multiplexing multiple MAC SDUs into a given MAC PDU) and SL HARQ retransmissions/receptions.

An RLC protocol layer performs RLC SDU segmentation/SDU reassembly, re-segmentation of RLC SDU segments, error correction through ARQ (only for AM data transfer). PDCP protocol layer performs header compression/decompression, ciphering and/or integrity protection, duplication detection, re-ordering and in-order packet delivery to the upper layer and out-of-order packet delivery to the upper layer.

A RRC protocol layer performs transfer of a SL-RRC message between peer UEs, maintenance and release of SL-RRC connection between two UEs, and detection of SL radio link failure for a SL-RRC connection. SDAP protocol layer performs mapping between a quality of service (QoS) flow and a SL data radio bearer.

In 3GPP standard specification, the basic SL communication functionalities are supported and specified. For Rel-17 of 3GPP standard specification, it is planned to introduce more enhanced features into SL. One of features is to introduce SL discontinuous reception (DRX) for broadcast, groupcast and unicast. Note in Rel-16 of 3GPP standard specification, a UE DRX operation is specified for downlink (DL) only. Detailed DL DRX operation is specified in 3GPP standard specification (e.g., MAC).

For an RRC connected UE, if the UE is involved in SL communication also, the UE may have two DRXs (i.e., one for DL and one for SL). If the UE's active times for DL DRX and SL DRX are coordinated together, it can bring more power saving gains or reduce the interference/collision between DL and SL. Here in order to achieve it, it is provided such a UE reports the observed SL DRX information in which the UE is involved or the gNB requested (e.g., for SL communication involving the gNB's requested source id and/or destination id).

Figure 8:
FIG. 8 illustrates a signaling flow for the coordination between DL DRX and SL DRX according to embodiments of the present disclosure.

FIG. 8 illustrates a signaling flow 800 for the coordination between DL DRX and SL DRX according to embodiments of the present disclosure. An embodiment of the signaling flow 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

FIG. 8 illustrates one example of embodiments to support a coordination between DL DRX and SL DRX. SL TX UE #1 and SL TX UE #2 indicate the different SL UE who has different source id or SL link ID and transmits the SL control/data to the SL UE #3 in RRC connected. A gNB is the serving gNB for SL UE #3. There could be multiple options regarding how to support SL DRX. One option is the SL DRX configuration information is exchanged between SL TX UE and SL RX UE by explicit signaling (e.g., by SL-RRC protocol message, SL MAC control element (CE)/header (HD)), or SL physical control information (e.g., PSCCH or new SL physical control channel)).

In this case, for example SL DRX related timing information is configured, e.g., by SL-RRC, between SL TX UE #1 and SL UE #3 and between SL TX UE #2 and SL UE #3. SL DRX related timing information includes an SL DRX on-duration timer, an SL DRX inactivity timer, an SL DRX HARQ retransmission timer, an SL DRX HARQ round trip timer (RTT) timer, an SL DRX cycle length, and an SL DRX start offset, etc.

It is note that functions of SL DRX on-duration timer, SL DRX inactivity timer, SL DRX HARQ retransmission timer, SL DRX HARQ RTT timer, SL DRX cycle length, and SL DRX start offset are quite similar to on-duration timer, inactivity timer, HARQ retransmission timer, HARQ RTT timer, DRX cycle length and DRX start offset that are specified for DL DRX in 3GPP standard specification TS38.321 (MAC). However, for SL communication each SL DRX configuration is applied to each SL communication (e.g., SL communication with the corresponding source id, SL communication with the corresponding destination id, or SL communication with the corresponding source id and destination id) and the SL DRX timers and start offset are applied to the SL channel reception, for example physical sidelink control channel (PSCCH) and physical sidelink shared channel (PSSCH).

If the explicit SL DRX configuration, e.g., by SL RRC, is applied to support SL DRX, the SL UE #3 already have full SL DRX configurations information once it was configured between involved SL UEs. For example, SL UE #3 has full SL DRX configuration for SL communication from SL TX UE #1 and full SL DRX configuration for SL communication from SL TX UE #2 once the SL DRX was configured between the UEs, e.g., by SL RRC. Then SL UE #3 may perform SL DRX operation according to the configured DRX parameters.

For instance, for SL PSCCH/PSSCH reception from SL TX UE #1, the SL UE #3 may determine the timing for initial PSCCH/PSSCH reception according to SL DRX start offset (e.g., the first incoming time slot that meets a defined equation using SL DRX start offset), starts SL DRX on-duration timer, monitor PSCCH/PSSCH while SL DRX on-duration timer runs, (re)start SL DRX inactivity timer if PSCCH/PSSCH includes the resource allocation information for initial transmission from SL TX UE #1 (possibly and it is destined to SL UE #3), continue monitoring of PSCCH/PSSCH while SL DRX inactivity timer runs, and if the UE fails to successfully receive the data from the SL TX UE #1's initial transmission, SL UE #3 monitors PSCCH/PSSCH for SL TX UE #1's HARQ retransmission according to SL DRX HARQ RTT and SL DRX HARQ retransmission timers (e.g., SL UE #3 monitors PSCCH/PSSCH during the period SL DRX HARQ retransmission timers runs after SL DRX HARQ RTT expires). The gNB may transmit SL DRX information request (REQ), e.g., by a dedicated RRC message, to request for the UE to report SL DRX configurations.

SL DRX information REQ can include the indication whether this request is for all SL links the UE is involved or for only SL links with the requested source id or destination id or both source id and destination id. For example, if all (all SL links the UE is involved) is included, SL UE #3 includes SL DRX configurations for all SL communications in which the UE is participating. For example, in the figure assuming SL communications with SL TX UE #1 and SL TX UE #2 are all SL communications in which SL UE #3 is participating, SL UE #3 includes both SL DRX configuration from SL TX UE #1 and SL DRX configuration from SL TX UE #2 into SL DRX information RES if both SL communications operates in SL DRX. If not all SL communications in which the UE is participating operate in SL DRX (e.g., in the figure if none of SL communications with SL TX UE #1 and SL TX UE #2 operates in SL DRX or only one of SL communications with SL TX UE #1 and SL TX UE #2 operates in SL DRX), SL UE #3 includes an indication indicating SL DRX is not applied to all SL communications in which the UE is participating into SL DRX information RES or alternatively SL UE #3 includes only SL DRX configurations for which the SL communications that operate in SL DRX into SL DRX information RES. Another alternative is SL UE #3 does not respond SL DRX information RES. If SL DRX information REQ includes the requested source id or the source id and destination id and it indicates the SL communication with SL TX UE #1, SL UE #3 includes only SL DRX configuration from SL TX UE #1. When SL UE #3 receives SL DRX information REQ, SL UE #3 sends the configured SL DRX information into SL DRX information RES (Response) message to the gNB if needed.

SL DRX configurations reported to the gNB include list of {source id (possibly with destination id), and the corresponding active time information (e.g., SL DRX on-duration timer, SL DRX inactivity timer, SL DRX HARQ retransmission timer, SL DRX HARQ RTT timer, SL DRX cycle length, and SL DRX start offset, etc.).

In one r example to reduce the signaling overhead for SL DRX configurations to be included into SL DRX information RES, SL UE #3 includes only SL DRX configurations which are not dependent on the dynamic scheduling (e.g., whether initial transmission is received or whether initial transmission or retransmission is successfully received or not). SL DRX configurations can be divided into two categories.

The first category is SL DRX configurations which are not dependent on the dynamic scheduling (e.g., whether initial transmission is received or whether initial transmission or retransmission is successfully received or not). For example, SL DRX start offset, SL DRX cycle length and SL DRX on-duration timer are semi-static and not dependent on the dynamic scheduling (e.g., timers' starting, restarting and terminating does not have any dependency with the dynamic scheduling).

The second category is SL DRX configurations which are dependent on the dynamic scheduling (e.g., whether initial transmission is received or whether initial transmission or retransmission is successfully received or not). For example, SL DRX inactivity timer, SL DRX HARQ RTT and SL DRX HARQ retransmission timer have some dependency with the dynamic scheduling (e.g., SL DRX inactivity timer is restarted once SL control information for initial transmission is received, SL DRX HARQ RTT and SL DRX HARQ retransmission timer are applied only if initially transmitted packet or retransmitted packet is not successfully received, etc.). The coordination with DL DRX and SL DRX taking second category SL DRX configurations into account could bring much signaling overheads between the gNB and the UE, SL UE #3 includes only the first category SL DRX configurations into SL DRX information RES. Note SL UE #3 may still need PSCCH/PSSCH reception regardless of data packet receptions from SL TX UE #1 and/or SL TX UE #2, for instance, if SL UE #3 needs to perform SL channel sensing (including PSCCH/PSSCH) in order for own SL transmission to the other UE if the SL UE #3 is also configured for SL transmission.

For this case, the SL UE #3 also includes list of {destination id (possibly with source id), the corresponding active time information based on own transmission timing and channel sensing type indication. Channel sensing type indication informs whether full channel sensing or partial channel sensing or random selection is applied to channel sensing purpose.

The difference between full channel sensing and partial channel sensing is the time duration the UE needs to monitor the corresponding SL channels for SL channel sensing purpose, e.g., full channel sensing requires longer time the UE needs to monitor the corresponding SL channels (PSCCH/PSSCH) while partial channel sensing requires shorter time the UE needs to monitor the corresponding SL channels (PSCCH/PSSCH).

A random selection is the resource allocation for transmission without channel sensing. Since each mechanism needs quite different time duration to monitor SL channel (including PSCCH/PSSCH), this indication helps the gNB to coordinate between DL active time and SL active time. Once the gNB receives SL DRX information RES, the gNB takes the received SL active time and inactive time into account for setting DL DRX configuration, for instance DL active time is set to be closer to SL active time for efficient UE power saving or resource allocation (in PDCCH) for UL transmission is not overlapped with SL active time (if a single radio frequency (RF) chain is used for both UL transmission and SL reception/transmission) for reduction of DL and SL collision/interference, etc. Once DL DRX configuration is set taking the received SL DRX configuration information into account, the gNB transmits the DL DRX configuration to the SL UE #3 by dedicated RRC message (e.g., RRC connection reconfiguration).

The aforementioned examples and/or embodiments assumed that the SL DRX configuration is configured by explicit signaling, e.g., SL RRC, MAC CE/HD or physical control information. If an SL DRX configuration is not configured by explicit signaling, then the UE needs to set the SL DRX configuration according to the SL control information and/or SL data reception timing. For example, when the SL UE #3 receives the first PSCCH (SL control information) or the first PSSCH (SL data) from SL TX UE #1, this timing can be used to set SL DRX start offset value and if there is SL TX UE #1's SL HARQ retransmission, this timing can be used to set SL HARQ RTT (e.g., time duration between the initial transmission and HARQ retransmission).

If there are multiple HARQ retransmissions (although it's not described in the figure), the time difference between the consecutive retransmissions can be used to set SL DRX HARQ RTT and SL DRX HARQ retransmission timer. For example, if 2nd HARQ retransmission is delayed from (1st HARQ retransmission timing plus HARQ RTT), then an SL DRX HARQ retransmission timer needs to be long enough to cover this delay. Or if 2nd HARQ retransmission is faster than (1st HARQ retransmission timing plus HARQ RTT), then SL DRX HARQ RTT needs to be shorten according to the time distance between 1st HARQ retransmission timing and 2nd HARQ retransmission timing.

SL TX UE #1's next initial transmission timing can be included in the physical control information in PSCCH/PSSCH or MAC CE/HD (Header), this timing can be used to set SL DRX cycle length (e.g., time duration between the previous initial transmission and the next initial transmission). When SL UE #3 receives the SL TX UE #1's next initial transmission, if this timing is somewhat delayed compared to the timing included in the physical control information in PSCCH/PSSCH or MAC CE/HD, this timing can be used to set SL DRX on-duration timer and/or SL DRX inactivity timer (e.g., SL DRX on-duration timer and/or SL DRX inactivity timer needs to be long enough to cover this delay).

Another example for SL DRX on-duration timer and/or SL DRX inactivity timer is pre-defined value and based on the observed this delay, the aforementioned examples can be extended or shorten. When SL DRX information is requested by the gNB, the UE responses the observed SL DRX configuration to the gNB.

Although it is not described in the figure, another example is SL UE #3 sends some indications indicating whether all SL communications in which the UE is participating operate in SL DRX or whether only some SL communications in which the UE is participating operate in SL DRX (which means some other SL communications in which the UE is participating do not operate in SL DRX) or whether all SL communications in which the UE is participating do not operate in SL DRX. The UE sends the indications before SL DRX information REQ from the gNB and the gNB can take the received indications into account when the gNB set the required information in SL DRX information REQ. The UE needs to send the indication whenever the status is changed in the SL communications in which the UE is participating.

Figure 9:
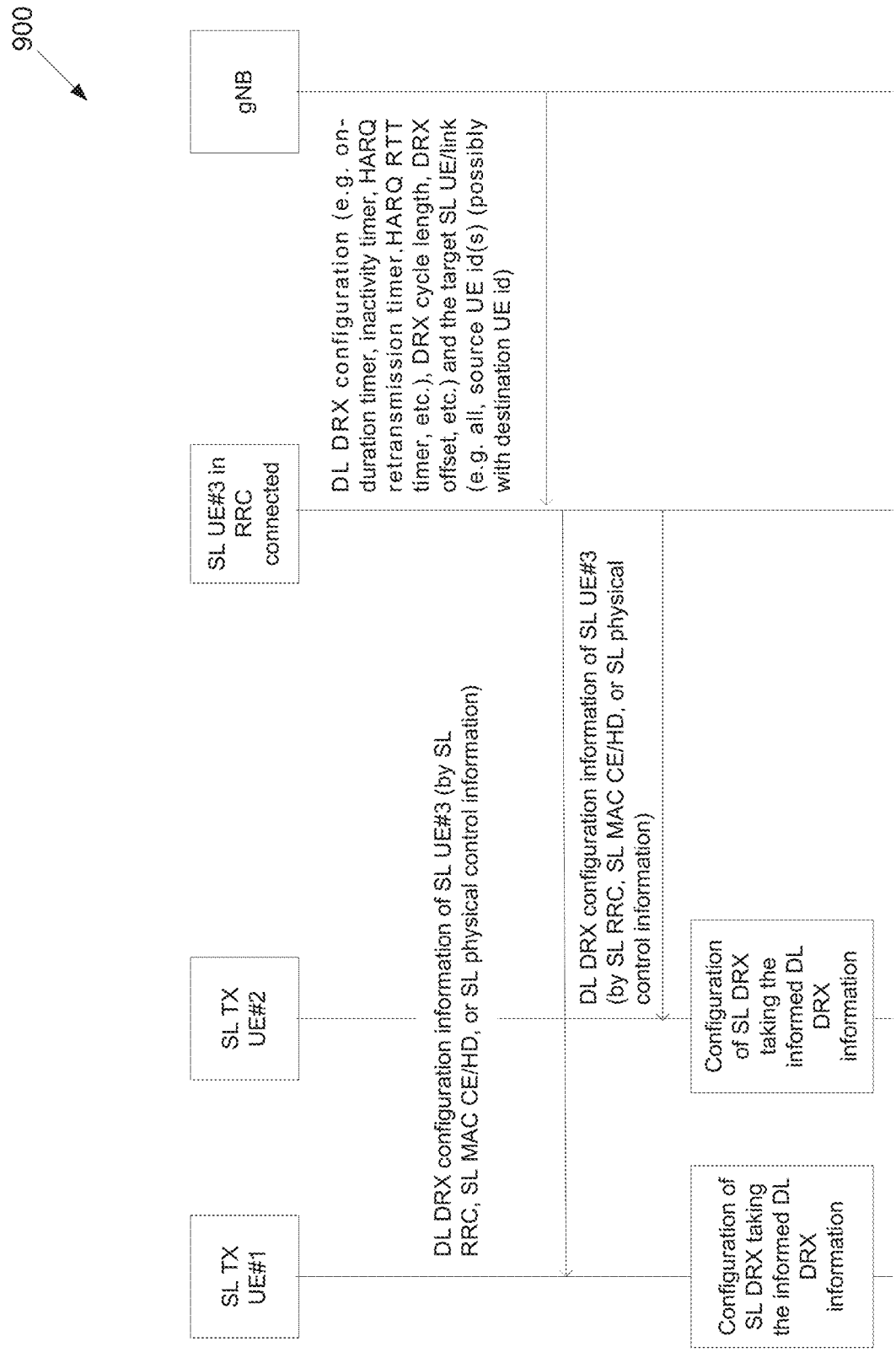
FIG. 9 illustrates another signaling flow for the coordination between DL DRX and SL DRX according to embodiments of the present disclosure.

FIG. 9 illustrates another signaling flow 900 for the coordination between DL DRX and SL DRX according to embodiments of the present disclosure. An embodiment of the signaling flow 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

FIG. 9 illustrates another example of embodiments to support coordination between DL DRX and SL DRX. SL TX UE #1 and SL TX UE #2 indicate the different SL UE who has different source ID or SL link ID and transmits the SL control/data to the SL UE #3 in RRC connected. The gNB is the serving gNB for SL UE #3. The gNB configures DL DRX configuration (and possibly the suggested SL DRX configuration to a SL communication with the source id, destination id or a pair of source and destination id) to the SL UE #3 by dedicated RRC message (e.g., RRC connection reconfiguration).

A DL DRX configuration includes an DL DRX on-duration timer, an DL DRX inactivity timer, an DL DRX HARQ retransmission timer, an DL DRX HARQ RTT timer, a DL DRX cycle length, and a DL DRX start offset, etc. For more detailed parameter information for DL DRX, 3GPP standard specification TS38.321 (MAC) can be referred. Once the SL UE #3 receives DL DRX configuration information (possibly and the suggested SL DRX configuration to a SL communication) from the gNB, the SL UE #3 explicitly signals (or forwards) the DL DRX configuration information to all involved SL TX UEs or the indicated SL TX UEs with the corresponding source id, destination id or a pair of source and destination id (if source id, destination id or a pair of source and destination id information is also included), or the SL UE #3 explicitly signals (or forwards) the suggested SL DRX configuration to the indicated SL TX UEs with the corresponding source id, destination id or a pair of source and destination id. This information can be signaled by SL RRC message, SL MAC CE/HD, or SL physical control information. Then the SL TX UE #1 and SL TX UE #2 configure/update SL DRX (or SL active time) taking the informed DL DRX configuration information or suggested SL DRX configuration into account.

For instance, SL active time is set to be closer to DL active time or SL active time is not overlapped with the resource allocation (in PDCCH) for UL transmission (if single RF chain is used for both UL transmission and SL reception/transmission). The gNB may include the target SL UE/link information when the gNB configures DL DRX configuration to the SL UE #3. The gNB can request the coordination of SL DRX with DL DRX is applied to all involved SL TX UEs, or only SL TX UEs/links with the requested source id(s) (possibly with the destination id).

For example, if all is indicated, the SL UE #3 explicitly signals (or forwards) the DL DRX configuration information to all SL TX UEs (e.g., both SL TX UE #1 and SL TX UE #2) while if the source id indicates SL TX UE #1 only, SL UE #3 signals (or forwards) the DL DRX configuration information only to SL TX UE #1.

As an additional example, in both FIG. 8 and FIG. 9 when the SL UE #3 reports SL DRX configuration to the gNB or the SL UE #3 signals DL DRX configuration to the SL TX UEs, SL timing in SL DRX configuration may need to be interpreted to serving cell's DL timing or DL timing in DL DRX configuration may need to be interpreted to SL timing (considering for SL communication, logical SL specific timing is used, which is not exactly same as DL timing).

One of NR features in 3GPP standard specification is NR-based access to unlicensed spectrum (NR-U). NR-U is to enable NR radio access operating with shard spectrum channel access. Since unlicensed spectrum may be shared with other radio access technology (e.g., wireless LAN (WLAN), etc.), the gNB and UE may apply listen-before-talk (LBT) before performing a transmission on NR-U cells. When LBT is applied, the transmitter listens to/senses the channel to determine whether the channel is free or busy and performs transmission only if the channel is sensed free.

For the mixed scenarios where the licensed band operation and the unlicensed band NR-U operation can coexist (e.g., two are overlapped in the frequency domain either with defined two separate bands or with defined single band), different format/type of master information block (MIB) and/or system information block (SIB) may be used for different kinds of operation, e.g., existing MIB and/or SIB format/type is used for the legacy licensed band operation while new MIB and/or SIB format/type may be introduced for the unlicensed band operation. Note there is also possibility that only unlicensed band NR-U operation or only licensed band operation may exist.

The current system information handling (i.e., existing MIB and SIB) is specified as shown in TABLE 1. TABLE 1 shows a general description in the 3GPP standard specification (e.g., NR and NG-RAN overall description).

TABLE 1

7.3 System Information Handling
7.3.1 Overview
System Information (SI) consists of a MIB and a number of SIBs, which are divided into Minimum SI and Other SI:
Minimum SI comprises basic information required for initial access and information for acquiring any other SI. Minimum SI consists of:
MIB contains cell barred status information and essential physical layer information of the cell required to receive further system information, e.g., CORESET #0 configuration. MIB is periodically broadcast on BCH.
SIB1 defines the scheduling of other system information blocks and contains information required for initial access. SIB1 is also referred to as Remaining Minimum SI (RMSI) and is periodically broadcast on DL-SCH or sent in a dedicated manner on DL-SCH to UEs in RRC_CONNECTED.
Other SI encompasses all SIBs not broadcast in the Minimum SI. Those SIBs can either be periodically broadcast on DL-SCH, broadcast on-demand on DL-SCH (i.e., upon request from UEs in RRC_IDLE or RRC_INACTIVE) or sent in a dedicated manner on DL-SCH to UEs in RRC_CONNECTED. Other SI consists of:
SIB2 contains cell re-selection information, mainly related to the serving cell;
SIB3 contains information about the serving frequency and intra-frequency neighbouring cells relevant for cell re-selection (including cell re-selection parameters common for a frequency as well as cell specific re-selection parameters);
SIB4 contains information about other NR frequencies and inter-frequency neighbouring cells relevant for cell re-selection (including cell re-selection parameters common for a frequency as well as cell specific re-selection parameters);
SIB5 contains information about E-UTRA frequencies and E-UTRA neighbouring cells relevant for cell re-selection (including cell re-selection parameters common for a frequency as well as cell specific re-selection parameters);
SIB6 contains an ETWS primary notification;
SIB7 contains an ETWS secondary notification;
SIB8 contains a CMAS warning notification;
SIB9 contains information related to GPS time and Coordinated Universal Time (UTC).
For a cell/frequency that is considered for camping by the UE, the UE is not required to acquire the contents of the minimum SI of that cell/frequency from another cell/frequency layer. This does not preclude the case that the UE applies stored SI from previously visited cell(s).
If the UE cannot determine the full contents of the minimum SI of a cell by receiving from that cell, the UE shall consider that cell as barred.
In case of BA, the UE only acquires SI on the active BWP.

Figure 10:
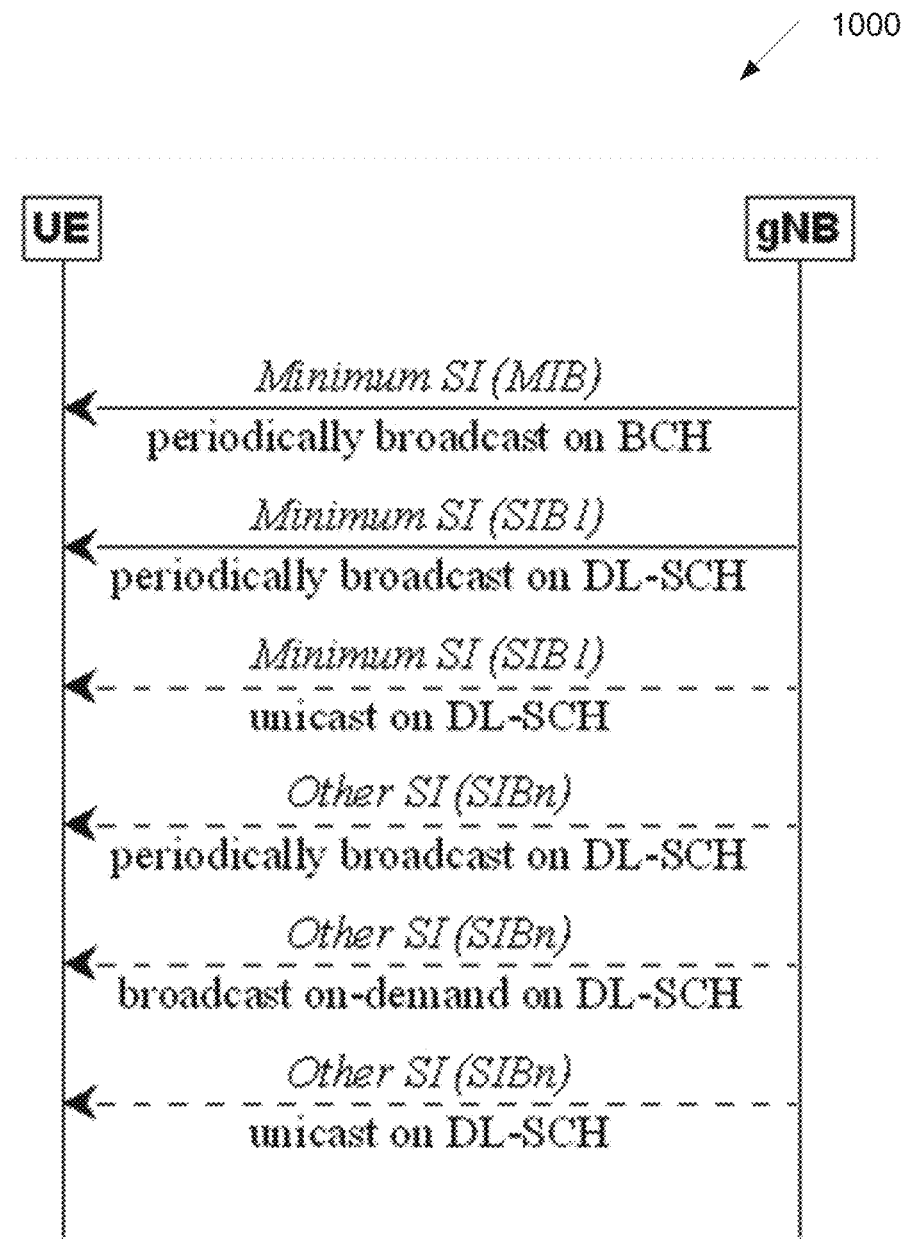
FIG. 10 illustrates a signaling flow for system information provisioning.

FIG. 10 illustrates a signaling flow 1000 for system information provisioning. Elements of TABLE 1 are illustrated in FIG. 10. In NR, a UE reporting of cell global identifier (CGI) procedure is specified as part of measurement configuration and UE measurement report in 3GPP standard specification (e.g., RRC). The overall procedure is described as follows. In one example of the overall procedure, a gNB configures measurement configuration for UE CGI reporting, including the corresponding measurement object, measurement report and the measurement ID. A measurement object configuration includes the target reference signal information to be measured (e.g., including synchronization signal blocks (SSBs)/CSI-reference signal (CSI-RS) to be measured, a band indicator, physical cell information to be measured and not to be measured, etc.). A measurement report configuration includes the information how and when the UE triggers measurement reporting procedure (e.g., including the indication whether this measurement reporting is for CGI report or not, physical cell id to indicate for which cell the UE needs to acquire CGI, etc.).

A measurement id is reference id to link the corresponding measurement configuration and measurement report configuration.

In another example of overall procedure, a UE reads MIB and SIB1 from the cell with the indicated physical cell id and acquire CGI information from the SIB1 if the UE received the measurement configuration to perform CGI measurement reporting via measurement configuration from the gNB.

In yet another example, a UE sends measurement report to the gNB (including the acquired CGI information) if the UE acquired CGI information from the indicated cell or the associated timer to acquire CGI information expires.

When the licensed band operation and unlicensed band operation can exist in a given band, as described in the earlier, different MIB and/or SIB format/type can be used for each operation. A UE does not know which format/type is used in the target band to be measured for CGI measurement reporting, so the UE would fail to acquire CGI information from the corresponding SIB1 or the UE would need to attempt CGI information acquisition two times (one attempt is based on the assumption existing/current MIB and/or SIB format/type for licensed band operation is used and the other attempt is based on the assumption the new MIB and/or SIB format/type for unlicensed band operation is used).

One of example embodiments to solve the problem is to add the information to indicate which MIB and/or SIB format/type is used into the measurement configuration. This information can be included either as one-bit indication (e.g., if not present the existing/current MIB and/or SIB format/type is used and if present the new introduced MIB and/or SIB format/type is used) or as multi-bit indications (e.g., the first indication/code-point indicates MIB and/or SIB format/type #1 is used, the second indication/code-point indicates MIB and/or SIB format/type #2 is used, the third indication/code-point indicates MIB and/or SIB format/type #3 is used, etc.).

This information can be included either in measurement object configuration or measurement report configuration. Then the UE attempts to read MIB and/or SIB1 according to the indicated MIB and/or SIB format/type from the cell with the indicated physical cell id when the measurement configuration requested the UE to perform CGI measurement report. Note this embodiment can be applied to any scenario where multiple MIB and/or SIB formats/types may be used for a given band (regardless of purpose, i.e., no restriction only for the scenario between licensed band operation and unlicensed band operation).

Figure 11:
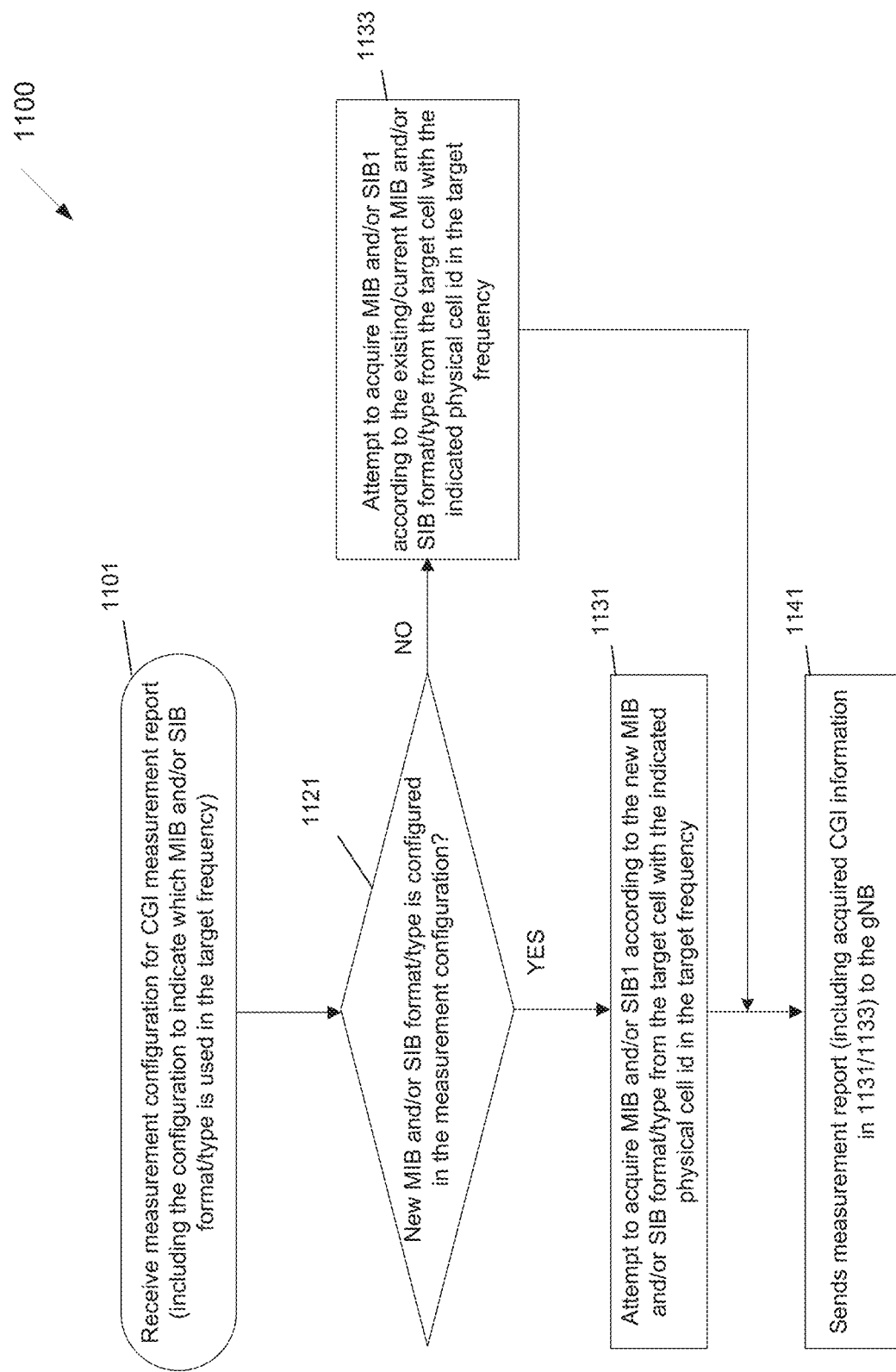
FIG. 11 illustrates a flowchart for enhanced CGI measurement report according to embodiments of the present disclosure.

FIG. 11 illustrates a flowchart of a method 1100 for enhanced CGI measurement report according to embodiments of the present disclosure. The method 1100 as may be performed by a UE (e.g., 111-116 as illustrated in FIG. 1). An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

As illustrated in FIG. 11, a UE receives measurement configuration to request to perform CGI measurement report (at step 1101). This measurement configuration includes the information to indicate which MIB and/or SIB format/type is used when the UE acquires CGI from the cell with the indicated physical cell id in the target frequency. This information can be included either as one-bit indication (e.g., if not present the existing/current MIB and/or SIB format/type is used and if present the new introduced MIB and/or SIB format/type is used) or as multi-bit indications (e.g., the first indication/code-point indicates MIB and/or SIB format/type #1 is used, the second indication/code-point indicates MIB and/or SIB format/type #2 is used, the third indication/code-point indicates MIB and/or SIB format/type #3 is used, etc.).

This information can be included either in a measurement object configuration or a measurement report configuration. It may be assumed that one-bit indication is used in FIG. 11, the UE checks whether new MIB and/or SIB format/type is configured for CGI measurement report (at step 1121). If new MIB and/or SIB format/type is configured, the UE attempts to acquire MIB and/or SIB1 according to the new MIB and/or SIB format/type from the target cell with the indicated physical cell id in the target frequency (at step 1131).

Otherwise, the UE attempts to acquire MIB and/or SIB1 according to the existing/current MIB and/or SIB format/type from the target cell with the indicated physical cell id in the target frequency (at step 1133). Although it is not described in FIG. 11, if multi-bit indications are used the UE attempts to acquire MIB and/or SIB1 according to the indicated MIB and/or SIB format/type from the target cell with the indicated physical cell id in the target frequency. Once the UE acquired CGI information from the SIB1 or if the associated timer expires before acquisition of CGI information, the UE sends measurement report (including the acquired CGI information in either step 1131 or 1133) to the gNB (step 1141).

It is noted that MIB and/or SIB format/type includes not only different interpretation on the information included in MIB and/or SIB (e.g., with different MIB and/or SIB format/type, each bit included MIB and/or SIB can be interpreted as the different meaning/purpose) but also different MIB and/or SIB transmission mechanism (e.g., with different MIB and/or SIB format/type, MIB and/or SIB can be transmitted over different frequency and/or time locations).

It may be assumed that the UE needs to acquire MIB first (to know how to acquire SIB1), then acquires SIM that includes CGI information, however if the UE does not need to acquire MIB to acquire SIM, the gNB can only configure SIM format/type information in the measurement configuration and in the case the UE directly attempts to acquire SIM (without acquisition of MIB) from the cell with the indicated physical cell id in the target frequency. Note this embodiment can be applied to any scenario where multiple MIB and/or SIB formats/types may be used for a given band (regardless of purpose, i.e., no restriction only for the scenario between licensed band operation and unlicensed band operation).

In another example embodiment to solve the problem of avoiding different MIB and/or SIB format/type for each operation between PCell and SCell is restricting the frequency location of SS/PBCH block in the measurement configuration for UE CGI reporting. For one instance, a UE assumes the frequency location of SS/PBCH block for CGI measurement is not aligned with any of the global synchronization channel numbers (GSCNs) associated with the overlapping bandwidth.

For another instance, a UE assumes the frequency location of SS/PBCH block for CGI measurement is not aligned with any of GSCNs associated with both of the licensed band and unlicensed band. For yet another instance, a UE assumes that the frequency location of SS/PBCH block for CGI measurement is not aligned with any GSCN corresponding to synchronization raster and within the overlapping bandwidth. For yet another instance, a UE assumes that the frequency location of SS/PBCH block for CGI measurement is not aligned with any GSCN corresponding to synchronization raster for the licensed band or unlicensed band.

Figure 12:
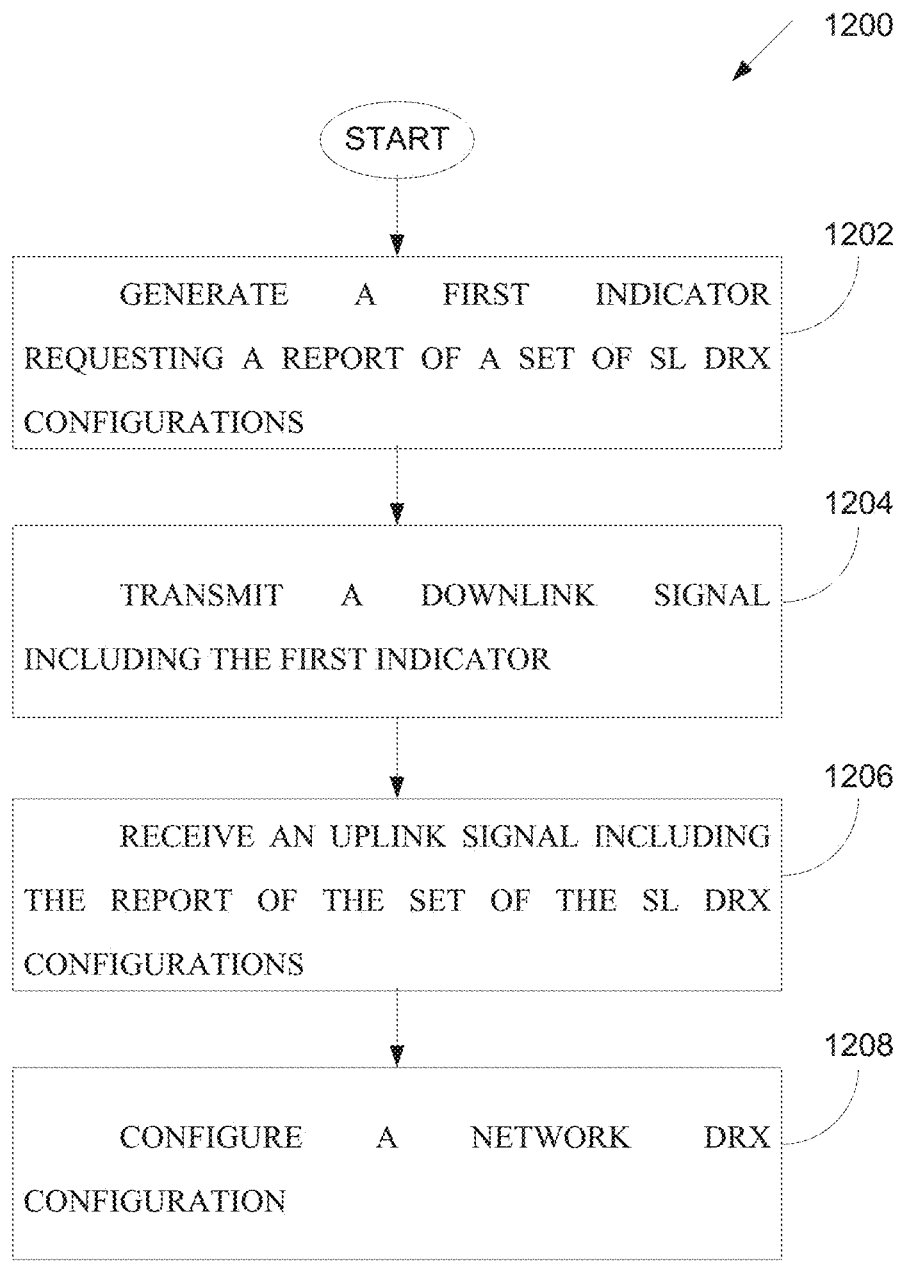
FIG. 12 illustrates a flow chart of a method for sidelink measurements in V2X communication according to embodiments of the present disclosure.

FIG. 12 illustrates a flow chart of a method 1200 for sidelink measurements in V2X communication according to embodiments of the present disclosure. The method 1200 as may be performed by a BS (e.g., 101-103 as illustrated in FIG. 1). An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, the method 1200 begins at step 1202. In step 1202, a BS generates a first indicator requesting a report of a set of SL DRX configurations for SL communications among UEs. As described herein, the phrase "a set of" as used, for example, in connection with SL DRX configurations means one or more SL DRX configurations.

In one embodiment, in step 1202, the report of the set of the SL DRX configurations comprises at least one of a source layer-2 ID or a destination layer-2 ID if a SL DRX operation is applied to a SL communication with a neighbor UE based on the at least one of the source layer-2 ID or the destination layer-2 ID. In another embodiment, in step 1203, the report of the set of the SL DRX configurations comprises information for entire SL communications with other UEs in which the UE participates if the SL DRX operation is applied to the entire SL communications, the entire SL communications comprising at least one of a unicast SL communication, a broadcast communication, or a groupcast communication.

In one embodiment, at least one of the set of the SL DRX configurations includes at least one of a source layer-2 ID, a destination layer-2 ID, or active time information including a value of a SL DRX on-duration timer, a value of a SL DRX inactivity timer, a value of a SL hybrid automatic repeat request (HARQ) retransmission timer, a value of a SL HARQ RTT timer, a value of a SL DRX cycle length, and a value of a SL DRX start offset.

In one embodiment, at least one of the set of the SL DRX configurations includes at least one of a destination layer-2 ID or active reception time information for the SL communications when the UE is configured for the SL communications with other UEs, the active reception time information being used for a channel sensing operation to select resources for the SL communications.

In step 1204, the BS transmits a downlink signal including the first indicator.

In step 1206, the BS receives an uplink signal including the report of the set of the SL DRX configurations based on the first indicator indicating that the report of the set of the SL DRX configurations is requested.

In step 1208, the BS configures, based on the report of the set of the SL DRX configurations, a network DRX configuration for a Uu interface between a UE and a network entity including the BS.

In one embodiment, the BS receives a second indicator via the uplink signal or another uplink signal that is received before receiving the uplink signal, wherein the second indicator indicates whether a SL DRX operation is applied for entire SL communications or part of the entire SL communications in which the UE is participated.

In one embodiment, the BS receives the uplink signal including the report of the set of the SL DRX configurations that comprise part of the set of the SL DRX configurations, wherein the part of the set of the SL DRX configurations includes at least one of a value of a SL DRX on-duration timer, a value of a SL DRX cycle length, or a value of a SL DRX start offset.

In one embodiment, the BS configures, based on the set of the SL DRX configurations, a value of a Uu DRX active timer of the network DRX configuration, the value of the Uu DRX active timer not overlapping with a value of a SL DRX active timer when the UE is configured with a single RF chain In one embodiment, the BS configures, based on the set of the SL DRX configurations, the value of the Uu DRX active timer of the network DRX configuration, the value of the Uu DRX active timer overlapping with the value of the SL DRX active timer when the UE is configured with multiple RF chains.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) comprising:
    a processor configured to generate a first indicator requesting a report of a set of sidelink (SL) discontinuous reception (DRX) configurations for SL communications among user equipments (UEs); and
    a transceiver operably connected to the processor, the transceiver configured to:
        transmit, to a UE among the UEs, a downlink signal including the first indicator; and
        receive, from the UE, an uplink signal including the report of the set of the SL DRX configurations based on the first indicator indicating that the report of the set of the SL DRX configurations is requested,
    wherein the processor is further configured to configure, based on the report of the set of the SL DRX configurations, a network DRX configuration for an interface between a UE and a network entity including the BS.

2. The BS of claim 1, wherein:
    the report of the set of the SL DRX configurations comprises at least one of a source layer-2 identification (ID) or a destination layer-2 ID if a SL DRX operation is applied to a SL communication with a neighbor UE based on the at least one of the source layer-2 ID or the destination layer-2 ID; or
    the report of the set of the SL DRX configurations comprises information for entire SL communications with other UEs in which the UE participates if the SL DRX operation is applied to the entire SL communications, the entire SL communications comprising at least one of a unicast SL communication, a broadcast communication, or a groupcast communication.

3. The BS of claim 1, wherein:
the transceiver is further configured to receive a second indicator via the uplink signal or another uplink signal that is received before receiving the uplink signal; and
the second indicator indicates whether a SL DRX operation is applied for entire SL communications or part of the entire SL communications in which the UE is participated.

4. The BS of claim 1, wherein at least one of the set of the SL DRX configurations includes at least one of a source layer-2 ID, a destination layer-2 ID, or active time information including a value of a SL DRX on-duration timer, a value of a SL DRX inactivity timer, a value of a SL hybrid automatic repeat request (HARQ) retransmission timer, a value of a SL HARQ round trip timer (RTT) timer, a value of a SL DRX cycle length, and a value of a SL DRX start offset.

5. The BS of claim 1, wherein at least one of the set of the SL DRX configurations includes at least one of a destination layer-2 ID or active reception time information for the SL communications when the UE is configured for the SL communications with other UEs, the active reception time information being used for a channel sensing operation to select resources for the SL communications.

6. The BS of claim 1, wherein:
the transceiver is further configured to receive the uplink signal including the report of the set of the SL DRX configurations that comprise part of the set of the SL DRX configurations; and
the part of the set of the SL DRX configurations includes at least one of a value of a SL DRX on-duration timer, a value of a SL DRX cycle length, or a value of a SL DRX start offset.

7. The BS of claim 1, wherein the processor is further configured to:
configure, based on the set of the SL DRX configurations, a value of a DRX active timer of the network DRX configuration, the value of the DRX active timer not overlapping with a value of a SL DRX active timer when the UE is configured with a single radio frequency (RF) chain; or
configure, based on the set of the SL DRX configurations, the value of the DRX active timer of the network DRX configuration, the value of the DRX active timer overlapping with the value of the SL DRX active timer when the UE is configured with multiple RF chains.

8. A method of a base station (BS), the method comprising:
generating a first indicator requesting a report of a set of sidelink (SL) discontinuous reception (DRX) configurations for SL communications among user equipments (UEs);
transmitting, to a UE among the UEs, a downlink signal including the first indicator;
receiving, from the UE, an uplink signal including the report of the set of the SL DRX configurations based on the first indicator indicating that the report of the set of the SL DRX configurations is requested; and
configuring, based on the report of the set of the SL DRX configurations, a network DRX configuration for an interface between a UE and a network entity including the BS.

9. The method of claim 8, wherein:
the report of the set of the SL DRX configurations comprises at least one of a source layer-2 identification (ID) or a destination layer-2 ID if a SL DRX operation is applied to a SL communication with a neighbor UE based on the at least one of the source layer-2 ID or the destination layer-2 ID; or
the report of the set of the SL DRX configurations comprises information for entire SL communications with other UEs in which the UE participates if the SL DRX operation is applied to the entire SL communications, the entire SL communications comprising at least one of a unicast SL communication, a broadcast communication, or a groupcast communication.

10. The method of claim 8, further comprising receiving a second indicator via the uplink signal or another uplink signal that is received before receiving the uplink signal, wherein the second indicator indicates whether a SL DRX operation is applied for entire SL communications or part of the entire SL communications in which the UE is participated.

11. The method of claim 8, wherein at least one of the set of the SL DRX configurations includes at least one of a source layer-2 ID, a destination layer-2 ID, or active time information including a value of a SL DRX on-duration timer, a value of a SL DRX inactivity timer, a value of a SL hybrid automatic repeat request (HARQ) retransmission timer, a value of a SL HARQ round trip timer (RTT) timer, a value of a SL DRX cycle length, and a value of a SL DRX start offset.

12. The method of claim 8, wherein at least one of the set of the SL DRX configurations includes at least one of a destination layer-2 ID or active reception time information for the SL communications when the UE is configured for the SL communications with other UEs, the active reception time information being used for a channel sensing operation to select resources for the SL communications.

13. The method of claim 8, further comprising receiving the uplink signal including the report of the set of the SL DRX configurations that comprise part of the set of the SL DRX configurations,
wherein the part of the set of the SL DRX configurations includes at least one of a value of a SL DRX on-duration timer, a value of a SL DRX cycle length, or a value of a SL DRX start offset.

14. The method of claim 8, further comprising:
configuring, based on the set of the SL DRX configurations, a value of a DRX active timer of the network DRX configuration, the value of the DRX active timer not overlapping with a value of a SL DRX active timer when the UE is configured with a single radio frequency (RF) chain; or
configuring, based on the set of the SL DRX configurations, the value of the DRX active timer of the network DRX configuration, the value of the DRX active timer overlapping with the value of the SL DRX active timer when the UE is configured with multiple RF chains.

15. A user equipment (UE) comprising:
a processor; and
a transceiver operably connected to the processor, the transceiver configured to:
receive, from a base station (BS), a downlink signal including a first indicator requesting a report of a set of sidelink (SL) discontinuous reception (DRX) configuration for SL communications with other UEs; and
transmit, to the BS, an uplink signal including the report of the set of the SL DRX configurations based on the first indicator indicating that the report of the set of the SL DRX configurations is requested, wherein a network DRX configuration is configured, based on the report of the set of the SL DRX configurations, for an interface between the UE and a network entity including a BS communicating with the UE.

16. The UE of claim 15, wherein:

the report of the set of the SL DRX configurations comprises at least one of a source layer-2 identification (ID) or a destination layer-2 ID if a SL DRX operation is applied to a SL communication with a neighbor UE based on the at least one of the source layer-2 ID or the destination layer-2 ID; or the report of the set of the SL DRX configurations comprises information for entire SL communications with other UEs in which the UE participates if the SL DRX operation is applied to the entire SL communications, the entire SL communications comprising at least one of a unicast SL communication, a broadcast communication, or a groupcast communication.

17. The UE of claim 15, wherein:

the transceiver is further configured to transmit a second indicator via the uplink signal or another uplink signal that is transmitted before transmitting the uplink signal; and the second indicator indicates whether a SL DRX operation is applied for entire SL communications or part of the entire SL communications in which the UE is participated.

18. The UE of claim 15, wherein:

at least one of the set of the SL DRX configurations includes at least one of a source layer-2 ID, a destination layer-2 ID, or active time information including a value of a SL DRX on-duration timer, a value of a SL DRX inactivity timer, a value of a SL hybrid automatic repeat request (HARQ) retransmission timer, a value of a SL HARQ round trip timer (RTT) timer, a value of a SL DRX cycle length, and a value of a SL DRX start offset; or the at least one of a set of the SL DRX configurations includes at least one of the destination layer-2 ID or active reception time information for the SL communications when the UE is configured for the SL communications with other UEs, the active reception time information being used for a channel sensing operation to select resources for the SL communications.

19. The UE of claim 15, wherein:

the transceiver is further configured to transmit the uplink signal including the report of the set of the SL DRX configurations that comprise part of the set of the SL DRX configurations; and the part of the set of the SL DRX configurations includes at least one of a value of a SL DRX on-duration timer, a value of a SL DRX cycle length, or a value of a SL DRX start offset.

20. The UE of claim 15, wherein the processor is further configured to:

identify, based on the set of the SL DRX configurations, a value of a DRX active timer of the network DRX configuration, the value of the DRX active timer not overlapping with a value of a SL DRX active timer when the UE is configured with a single radio frequency (RF) chain; or identify, based on the set of the SL DRX configurations, the value of the DRX active timer of the network DRX configuration, the value of the DRX active timer overlapping with the value of the SL DRX active timer when the UE is configured with multiple RF chains.

* * * * *